No. 879,010. PATENTED FEB. 11, 1908.
B. SCHMITT.
TRAP.
APPLICATION FILED NOV. 25, 1907.
2 SHEETS—SHEET 1.
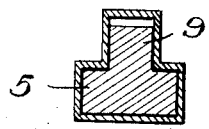
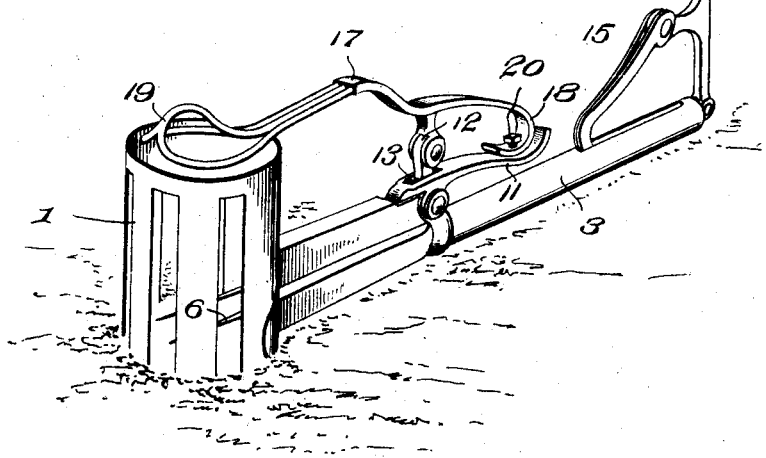
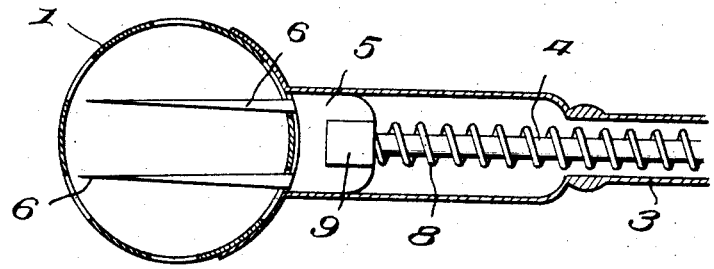
WITNESSES:
INVENTOR
B Schmitt
BY
W. J. Fitzgerald
Attorneys

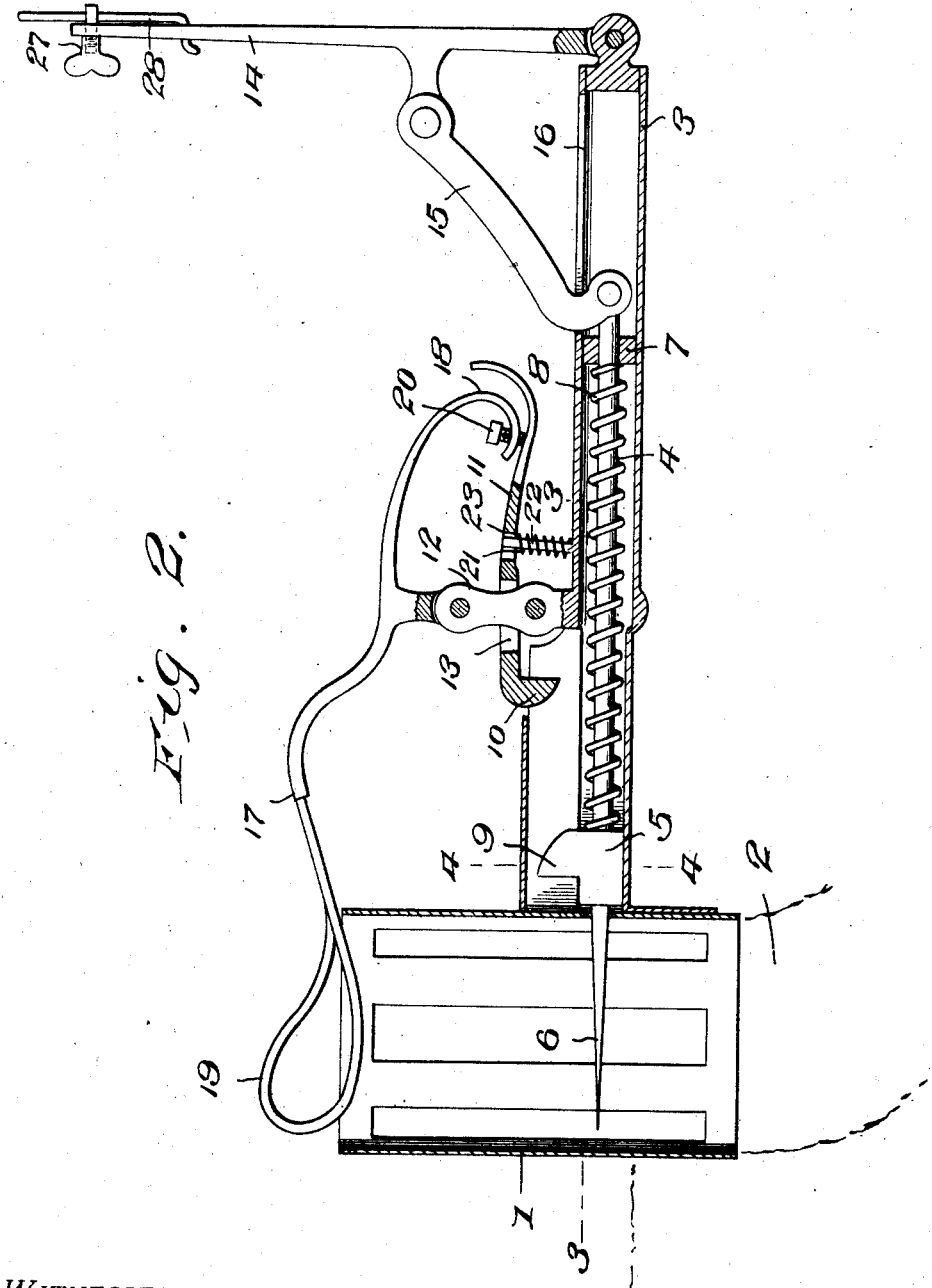

UNITED STATES PATENT OFFICE.

BASILIUS SCHMITT, OF BRAZIL, NORTH DAKOTA.

TRAP.

No. 879,010.  Specification of Letters Patent.  Patented Feb. 11, 1908.

Application filed November 25, 1907. Serial No. 403,795.

*To all whom it may concern:*

Be it known that I, BASILIUS SCHMITT, a citizen of the United States, residing at Brazil, in the county of Pierce and State of North Dakota, have invented certain new and useful Improvements in Traps; and I do hereby declare the following to be a full, clear, and exact description of the invention, such as will enable others skilled in the art to which it appertains to make and use the same.

My invention relates to new and useful improvements in traps and more particularly to that class employed for catching animals and my object is to provide means for catching an animal as it leaves its burrow or run-way.

A further object is to provide a trigger and extend the same in position to be engaged by the animal, whereby the trap will be sprung and a still further object is to provide a signal for the trap, whereby the operation of the same will be indicated.

Other objects and advantages will be hereinafter referred to and more particularly pointed out in the claims.

In the accompanying drawings which are made a part of this application, Figure 1 is a perspective view of my improved trap in its set position. Fig. 2 is a longitudinal, sectional view thereof. Fig. 3 is a sectional view as seen on line 3—3, Fig. 2, and, Fig. 4 is a sectional view as seen on line 4—4, Fig. 2.

Referring to the drawings in which similar reference numerals designate corresponding parts throughout the several views, 1 indicates the body of my improved trap, which is preferably cylindrical, one end of said body being adapted to extend into the run-way 2, so that the animal in emerging from the run-way, will enter the body 1.

Extending at right angles from the face of the body 1 is a tubular arm 3, in which is slidably mounted a plunger 4, one end of the plunger having a head 5, thereon, which carries impaling prongs 6, said prongs being so arranged that they will pass laterally through the opening in the body and impale an animal therein.

The arm 3 is provided with a block 7, through which the plunger 4 extends, the inner end of the plunger finding a bearing in the block and to cause the prongs to move outwardly from the arm and with considerable force, a tension spring 8 is placed around the plunger between the block 7 and head 5, the tension of said spring being such that when the head is released, the spring will move the prongs outwardly with sufficient force to pass the prongs through the body of the animal and securely hold the same until the prongs are again withdrawn into the arm.

The head 5 is provided with a projection 9, which is adapted to be engaged by a slip 10, on a latch 11, said latch being pivotally secured to an extension 12, carried by the arm 3, said extension extending through a slot 13 in the latch 11, the meeting edges of the lip and projection being curved, so that the projection will freely pass by the lip and be engaged thereby.

The plunger 4 is operated to draw the prongs 6 within the arm 3 by pivotally securing a standard 14 to the outer end of the arm 3 and extending a link 15 between the standard and the end of the plunger 4, said link extending through a slot 16 in the arm 3 and is of such length that when the prongs are moved into the body 1, the standard 14 will be in a vertical position and when it is desired to withdraw the prongs from the body and into the arm 3, the standard 14 is moved to the axial plane of the arm 3, which will result in moving the plunger 4 longitudinally through the arm until the projection 9 is moved beyond and engaged by the lip 10, in which position it is held until the trap is again sprung.

In order to operate the latch 11 and release the lip from the projection 9, a lever 17 is pivotally secured to the upper end of the extension 12, one end of which terminates in a curved finger 18, while the opposite end thereof is provided with a frame-like structure 19, which extends over the upper end of the body 1 and effectually stops the passage of the animal through the body.

The lever 17 serves the purpose of a trigger and when the animal engages the frame 19 in its efforts to escape, the finger 18 depresses the latch 11 and raises the lip out of engagement with the projection 9, when the spring 8 will throw the prongs 6 outwardly and impale the animal thereon and in order to increase or decrease the movement of the lever 17 required to release the lip 10 from the projection 9 the finger 18 is provided with a set screw 20, the lower end of which is adapted to engage the latch 11 and by turning the set screw downwardly through the finger, a shorter movement will be required to operate the lever and likewise a longer movement when the set screw is turned in the opposite direction.

The lip is normally held in the path of the projection 9 by means of a spring 21, which is directed around a stem 22 extending upwardly from the arm 3, said stem entering an opening 23 in the latch, said spring being located between the arm and latch, so that upward pressure will be directed on the latch at all times.

The free end of the standard 14 is provided with a signal 24, so that it can be readily ascertained from a distance when the trap has been sprung and as the trap is adapted to be set at various angles, the upper end 25 of the arm 14 is curved and provided with an elongated slot 26, through which extends a binding screw 27, said binding screw engaging the staff 28 of the signal, so that said staff may be set at various angles to the longitudinal plane of the standard, the lower end of the staff 28 being pivotally secured to the standard at a point below the curved end 25.

In operation, the lower end of the body 1 is placed in the open end of the run-way 2 and the standard 14 then moved in alinement with the axial plane of the arm 3, thereby setting the trap and as soon as the animal attempts to leave the run-way and presses against the frame 19, the latch 11 will be released from the projection 9 and the animal impaled on the prongs 6, at the same time the standard will be swung to the position shown in Figs. 1 and 2 of the drawings, or at right angles to the axial plane of the arm 3 and by having the signal 24 at the end of the standard 14, it can be readily ascertained from a distance when the trap is sprung.

What I claim is:

1. The herein described trap, comprising a body, an arm on said body, a plunger longitudinally movable in said arm, a head at one end of the plunger, prongs on said head, means to move said prongs into the body portion, a standard pivotally secured to one end of said arm, a link between said standard and plunger, whereby the prongs may be moved into the arm by lowering said standard, a trigger adapted to hold the prongs within the arm until released and means coöperating with said trigger and extended over one end of the body to operate said trigger when pressure is directed thereon.

2. In a trap of the class described, the combination with a body, having an opening therethrough; of an arm on said body and preferably at right angles thereto, prongs adapted to enter said body, a plunger in said arm, a head between said plunger and prongs, a latch adapted to engage said head and normally hold the prongs within the arm, means whereby the prongs may be moved into the head, a lever adapted to engage said latch and release the same from the head and a frame on said lever adapted to extend over one end of the body, whereby when an animal engages said frame, the trigger will be released from the head and means to move the prongs into the body under pressure.

3. In a trap of the class described, the combination with a body, having a tubular arm thereon; of a plunger in said arm, a head on said plunger, prongs on said head adapted to be moved into or out of said body, means to engage said head and hold the prongs within the body, additional means whereby the head may be released, a spring adapted to move the prongs into the body, a standard pivotally secured to one end of the arm, a link between said standard and plunger adapted to move the prongs into the arm when the standard is lowered and a signal at the upper end of said standard.

4. A trap of the class described, comprising the combination with a body, an arm on said body, a plunger in said arm, prongs on said plunger, means to normally hold the prongs in the arm and additional means whereby said prongs may be released; of a standard pivotally secured to said arm, means to connect said standard with the plunger, a signal pivotally secured to the upper end of said standard and means whereby said signal may be adjusted.

5. A trap of the class described, comprising the combination with a body and a tubular arm on said body; of a plunger slidably mounted in said arm, a head on said plunger, prongs fixed to said head, a spring adapted to move said prongs into the body, a latch pivotally secured to said arm, one end of which is adapted to engage said head and normally hold the prongs in the arm, means to hold the latch in the path of said head, a lever pivotally mounted above said latch, a curved finger at one end of said lever, means to increase or decrease the stroke of the finger required to release the latch, a frame at the opposite end of said lever, adapted to extend over one end of the body and means whereby said head may be moved into engagement with the latch.

In testimony whereof I have signed my name to this specification in the presence of two subscribing witnesses.

BASILIUS SCHMITT.

Witnesses:
ROCHUS EISENZIMMER,
JOSEPF HOBBORT.